April 7, 1970     H. REICH ET AL     3,504,775
AUTOMOTIVE SYNCHRONIZING CLUTCH
Filed June 11, 1968
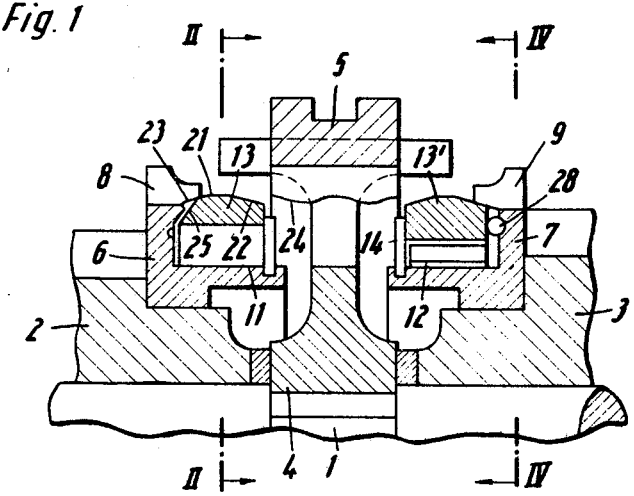
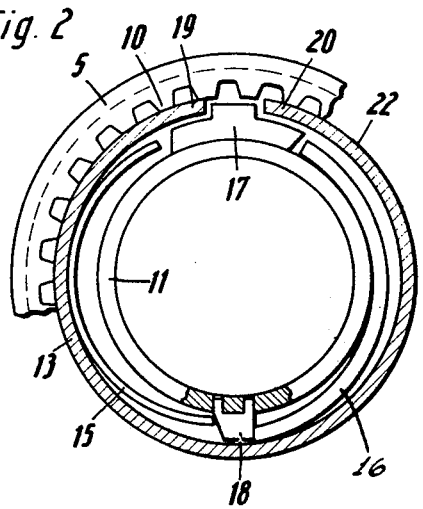
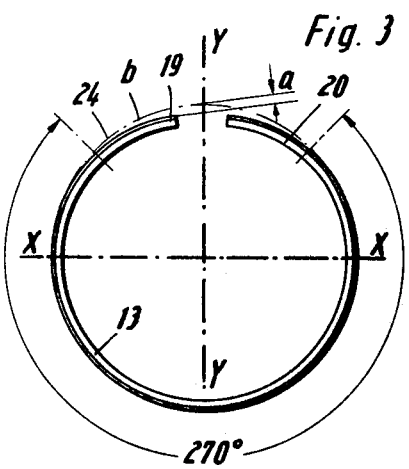
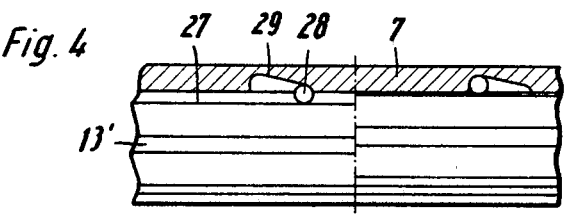
Inventors:
HANS REICH
JÖRG AUSTEN
EMIL KUNZ
BY Craig & Antonelli
ATTORNEYS United States Patent Office 3,504,775
Patented Apr. 7, 1970

3,504,775
AUTOMOTIVE SYNCHRONIZING CLUTCH
Hans Reich, Tamm, Wurttemberg, Jörg Austen, Weinsberg, Wurttemberg, and Emil Kunz, Kornwestheim, Wurttemberg, Germany, assignors to Firma Dr. Ing. h.c.F. Porsche KG, Stuttgart, Germany
Filed June 11, 1968, Ser. No. 736,084
Claims priority, application Germany, June 24, 1967, 1,630,941
Int. Cl. F16d 11/04
U.S. Cl. 192—53                                              11 Claims

ABSTRACT OF THE DISCLOSURE

The split synchronizing ring of the clutch is prestressed in an oval shape in the disengaged position of the clutch and is moved into a substantially circular shape by the cooperating friction surface of the axially shiftable clutch sleeve in the engaged position of the clutch, with the free ends of the ring being spaced radially inwardly from the sleeve by a distance approximately 0.5 to 1 mm. Spreading balls or separate conical surfaces are provided to assist the movement of the ring radially inwardly during synchronization.

BACKGROUND OF THE INVENTION

It is known to provide the clutch of an automotive vehicle change-speed gear transmission with a synchronizing clutch employing a slotted resilient synchronizer ring, which ring has a centering surface for maintaining it prestressed in its mounting on its respective clutch part in the disengaged position of the clutch. The ring is provided with a friction surface for cooperating with a similar friction surface of the shifting sleeve to provide for synchronization between the clutch members to be engaged. The centering surface and friction surface of the ring are generally oval in the disengaged position of the clutch and assume a generally circular shape during the synchronization process.

The above-mentioned configurations of the ring advantageously provide for maximum contact of the ring by the sleeve during synchronization; in the blocking position of the synchronizing ring, the cooperating friction surfaces of the ring and sleeve are fully effective. However, it has been found that this characteristic, which is per se desirable, causes a considerable expanding or spreading effect at the ends of the synchronizer ring, which produces undesirably high values for the blocking effect and correspondingly the shifting power to be expended.

SUMMARY OF THE INVENTION

In contrast to the above, it is an object of the present invention to provide a synchronizing ring that has a substantially oval shape in the disengaged position of the clutch for maximum frictional engagement during synchronization and to provide for a maximum lifetime of the ring.

According to the present invention, the above is accomplished by having the free ends of the synchronizer ring radially spaced inwardly a substantial distance from the corresponding adjacent friction surface of the shifting clutch sleeve during the synchronization, particularly in the blocking position. Thus, the decided advantage is attained that the area of the free ring ends of the synchronizer ring cannot exert any contact pressure on the bearing friction surfaces of the clutch shifting sleeve, which greatly reduces the blocking effect and simultaneously the wear and tear in a critical region of the synchronizer ring, when compared with the known devices. A particularly advantageous specific construction of the present invention has been found wherein the ring ends of the synchronizer ring are spaced radially inwardly on both sides of the ring slot or gap in a continuous manner, that is such that the ring extends smoothly from its portion contacting the shifting sleeve to the free ends. It is particularly desirable to provide the synchronizer ring with a contact angle of 270° with respect to the shifting sleeve, during synchronization.

The undesirable blocking effect of the synchronizer ring may be reduced additionally by providing means between the resilient synchronizer ring and the mounting clutch part of the clutch member to be shifted for assisting movement of the ring radially to reduce the blocking effect during the synchronization process in response to the axial pressure of the clutch shifting sleeve. Such a construction is particularly important with respect to shifting into the first gear of a change-speed gear transmission for an automotive vehicle, wherein the shifting process is conducted with the vehicle at a standstill. One particularly advantageous specific construction of such means may take the form of a conical surface on the synchronizer ring forming an angle with the ring centering surface, and a corresponding counter-conical surface on the clutch part. These cooperating conical surfaces will produce a radial component of force from the axial shifting force of the shifting sleeve during the synchronization process; this, in conjunction with the radially inwardly disposed ring ends, ensures a smooth shifting process. A second particularly advantageous specific construction of such means for reducing the blocking effect of the synchronizer ring may take the form of spreading or expanding elements arranged between the adjacent faces of the synchronizer ring and the cooperating clutch part of the clutch member to be engaged. Such constructions are particularly advantageous with respect to gears having large dimensions, which are to be synchronized.

BRIEF DESCRIPTION OF THE DRAWING

Further objects, features and advantages of the present invention will become more clear from the following detailed description of the preferred embodiment of the present invention specifically described for purposes of illustration with respect to the accompanying drawing, wherein:

FIGURE 1 is a partial cross sectional view taken through the axis of rotation of the synchronizing clutch, employing a synchronizer ring, for a change-speed gear transmission of an automotive vehicle, according to the present invention, in the neutral position;

FIGURE 2 is a partial cross sectional view taken along line II—II of FIGURE 1;

FIGURE 3 is a side view of the synchronizer ring in its blocking position, during the synchronization process; and FIGURE 4 is a development or projection onto a plane, of the cross section along line IV—IV of FIGURE 1.

DETAILED DESCRIPTION OF THE DRAWING

As shown in the partial cross sectional view of FIGURE 1, the automotive change-speed gear transmission synchronizing clutch of the present invention is provided with a rotatably mounted output shaft 1 having rotatably mounted thereon spur gears 2 and 3, which are respectively in constant meshing engagement with corresponding gears (not shown) on a counter parallel drive shaft (not shown). A shifting sleeve carrier 4 is splined to the output shaft 1, that is, provided with a driving connection, and carries an axially movable annular shifting clutch sleeve 5. The clutch parts 6 and 7 are rigidly connected with the gears 2, 3, respectively, for rotation therewith, and respectively provided with clutch teeth 8, 9 for meshing selectively with the inwardly extending shifting clutch teeth 10 of the clutch shifting sleeve 5 during the shifting process for drivingly connecting the shaft 1 selectively with either the gear 2 or the gear 3.

For synchronization, each of the clutch hubs 11, 12 of the clutch parts 6, 7 is provided with a resilient synchronizer ring 13, 13', respectively, which rings 13, 13' are prevented from moving axially inwardly, respectively, by snap-action washers or retaining rings 14. Resilient blocking bands 15, 16 are arranged respectively between the hubs 11, 12 of the clutches 6, 7 and the synchronizer rings 13, 13'; abutments 17, 18 are provided between the bands 15, 16. Only the bands and abutments for synchronizer ring 13 are specifically illustrated, because the corresponding structure for synchronizer ring 13' is substantially identical. The abutment member 17 is rotatably mounted, with respect to the hub 11, and has an outwardly extending nose between the free ring ends 19 and 20 of the synchronizer rings 13, 13', respectively. Each of the synchronizer rings 13, 13' is provided on its outer circumference with a centering surface 21 and a friction surface 22, each conically inclined with respect to each other radially inwardly and axially outwardly in the manner of a peaked roof. The centering surface 21 of each ring radially engages a correspondingly shaped centering surface 23 of the clutch part 6 or 7, to maintain the respective synchronizer ring in a pre-stressed condition with the clutch in the disengaged position of FIGURE 1.

The ring friction surface 22 cooperates with and engages the correspondingly shaped bearing friction surface 24 on the inner ends of the teeth 10 of the shifting sleeve 5. For increasing the blocking effect during shifting or synchronization, two specific constructions are shown respectively for ring 13 and ring 13'; although each ring is provided with a different means for reducing the blocking effect, it is contemplated that a single ring may be provided with both means in combination. The front face surface 25 of the synchronizer ring 13 that faces the clutch part 6 is conical and contacts a corresponding counter-conical surface 26 of the clutch part 6 during synchronization, which conical surfaces 25, 26 form angles with the corresponding adjacent centering surfaces 21, 23. The other specific construction for the means to reduce the blocking effect is shown with respect to ring 13', wherein a plurality of spreading elements or balls 28 are mounted between the corresponding front face 27 of the other synchronizer ring 13' and the adjacent clutch part 7, which balls 28 are circumferentially spaced. The balls 28 will cooperate with the inclined recesses 29 in the clutch part 9 during radial movement of the ring 13' for replacing conventional sliding friction by rolling friction.

In the illustrated disengaged position of the clutch of FIGURE 1, the synchronizer rings 13, 13' are of oval configuration, with their largest diameter being in the horizontal plane as viewed in FIGURE 2, which is at right angles to the vertical axial plane extending through the gap formed by the free ring ends 19 and 20. Because of this oval configuration in the disengaged position of the clutch, the synchronizer rings 13, 13' will assume a substantially circular shape, that is their surfaces will be surfaces of revolution, during the synchronization when the friction surfaces 22 and 24 are in full engagement with each other, that is, in the blocking position of the synchronizing clutch, as illustrated in FIGURE 3, with the horizontal and vertical planes being X—X and Y—Y, respectively. In the manufacture of the synchronizing rings 13 and 13', the rings are clamped in an appropriate bending device in the blocking position of FIGURE 3, before assembly, and the free ring ends 19 and 20 are bent smoothly inwardly a radial distance $a$ with respect to the circle defined by the major portion of the ring; this is the exact position that the rings 13, 13' will assume in the blocking position when mounted in the clutch, with the distance $a$ corresponding to the spacing between the ends 19, 20 and the adjacent friction surface 24 of the sleeve 5. Particularly desirable synchronizing characteristics are attained when the synchronizer ring, as illustrated in FIGURE 3, is provided with a contact angle between the surfaces 22 and 24 that has a circumferential extent of approximately 270°, and is provided with a spacing $a$ between the ring ends and the surface 24 within the range of 0.5 to 1 mm.

In operation, the shifting clutch sleeve 5 may be axially moved to the left, as viewed in FIGURE 1, so that the bearing friction surface 24 of the sleeve engages the corresponding frictional surface 22 of the synchronizer ring 13, which entrains the ring 13 in the circumferential direction so that the abutments 17, 18 will cause the band 15 or 16 to be spread apart, depending upon the direction of relative rotation. With further axial pressure upon the shifting sleeve 5, the bearing friction surface 24 of the shifting sleeve will be placed in full engagement with the corresponding friction surface 22 of the synchronizer ring 13. At the same time, the cooperating conical surfaces 25, 26 will produce a radial component of force from the axial pressure upon the synchronizer ring 13, which radial component of force will compress the ring 13 and reduce its diameter to thus reduce the blocking effect. If in this manner synchronization is achieved, the shifting clutch sleeve 5 may be shifted further to the left so that the sleeve clutch teeth 10 are brought into engagement with the gear clutch teeth 8. Thus, the shifting of the gears is completed.

If the shifting sleeve 5 is axially moved to the right, as viewed in FIGURE 1, the synchronizer ring 13' is subjected to a similar deformation as described above with respect to the synchronizer ring 13 during the synchronization process, which is caused by the abutments 17, 18 and the spreading bands 15, 16. To reduce the blocking effect during synchronization, the balls 28 contact the front face 27 of the synchronizer ring 13'. The balls 28 and the inclined recesses 29 associated therewith are constructed so that the synchronizer ring will not provide any axial friction resistance and will correspondingly be radially compressed. The expanding or spreading elements 28 further ensure that after synchronization is terminated, a relative rotation of the shifting sleeve 5 and the synchronizer ring 13 will have a low friction, whereby the teeth 10 of the shifting sleeve 5 and the teeth 9 of the clutch part 7 may mesh in a simple manner. This slight relative rotation is assisted by the elongation of the grooves 29 in the same direction and to substantially the same extent. The balls 28 act as an anti-friction bearing with respect to the planar surface 27 to reduce the otherwise high frictional force that would be caused by the axial shifting force perpendicular to the surface 27.

Although a preferred embodiment has been described in detail, further modifications, embodiments and variations are contemplated within the spirit and scope of the present invention.

We claim:

1. A synchronizing clutch, comprising: a first rotatable clutch member having a drivingly connected first clutch part; a second rotatable clutch member having a drivingly connected clutch sleeve axially shiftable with respect to said first clutch part between an engaged position of the clutch and a disengaged position of the clutch, said sleeve having a friction surface generally facing said first clutch part; a split synchronizer ring having a friction surface normally axially aligned with said sleeve friction surface for synchronizing contact therewith; at least the major portion of said friction surface being substantially oval in the disengaged position of the clutch and being substantially a surface of revolution in the engaged position of the clutch; said split ring having opposed free ends spaced a substantial radial distance from said sleeve friction surface in the engaged position of the clutch, wherein said split ring extends smoothly between said major portion of said ring centering surface and said ends; said major portion of said ring centering surface having only approximately 270° of contact with said sleeve in said engaged position of the clutch.

2. The clutch according to claim 1, including additional means between said synchronizer ring and said first clutch part assisting radial compression of said ring in response to axial pressure of said sleeve on said friction surface of said synchronizer ring.

3. The clutch according to claim 2, wherein said additional means is a conical front face on said ring adjacent and forming an angle with said centering surface of said ring and a correspondingly shaped counter-conical surface on said clutch part adjacent and forming an angle with said clutch part centering surface.

4. The clutch according to claim 2, wherein said additional means is a plurality of separate spreading means between said ring and said first clutch part.

5. The clutch according to claim 4, wherein said spreading means are a plurality of balls.

6. The clutch according to claim 1, wherein said radial distance is approximately within the range of 0.5 to 1 mm.

7. The clutch according to claim 1, wherein said first clutch part includes a centering surface and said synchronizer ring having a corresponding centering surface; said synchronizer ring being mounted with respect to said first clutch part in a pre-stressed condition in the clutch disengaged position.

8. The clutch according to claim 7, including additional means between said synchronizer ring and said clutch part assisting radial compression of said ring in response to axial pressure of said sleeve on said friction surface of said synchronizer ring.

9. The clutch according to claim 8, wherein additional means is a conical front face on said ring adjacent and forming an angle with said centering surface of said ring and a correspondingly shaped counter-conical surface on said clutch part adjacent and forming an angle with said clutch centering surface.

10. The clutch according to claim 8, wherein said additional means is a plurality of separate spreading means between said ring and said first clutch part.

11. The clutch according to claim 7, wherein said first clutch part has a hub; said ring surrounding and being mounted externally on said hub; said first clutch part having an externally toothed portion radially outwardly overhanging said ring and being provided with said clutch part centering surface engaging said split ring centering surface holding said split ring in an inwardly compressed condition corresponding to said pre-stressed condition of said ring in the clutch disengaged position; all of said surfaces being conical, with respect to the axis of rotation; said clutch sleeve having interior clutch teeth for engagement with said first clutch part teeth in the engaged position of the clutch; said clutch sleeve teeth having said sleeve friction surface on their inner ends; two spreader bands circumferentially spaced with respect to each other between said hub and said split ring defining two diametrically opposed gaps therebetween; said hub having fixed thereto one abutment member radially extending within one of said gaps; said split ring opposed free ends forming a ring gap therebetween defining said split; a second abutment member rotatably mounted with respect to said hub, radially extending within the other of said opposed gaps and radially extending between the opposed free ends of said split ring.

References Cited

UNITED STATES PATENTS

| 2,932,373 | 4/1960 | Schmid | 192—53.1 |
| 3,020,991 | 2/1962 | Altmann | 192—53.1 |
| 3,200,920 | 8/1965 | Reich | 192—53.3 |
| 3,239,044 | 3/1966 | Boguslawski | 192—53.3 |

FOREIGN PATENTS

| 1,332,492 | 6/1963 | France. |

BENJAMIN W. WYCHE III, Primary Examiner

U.S. Cl. X.R.

192—107